July 9, 1946.    W. L. CARLSON    2,403,500
SYSTEM FOR AND METHOD OF AIRCRAFT RADIO COMMUNICATION
Filed Oct. 22, 1941
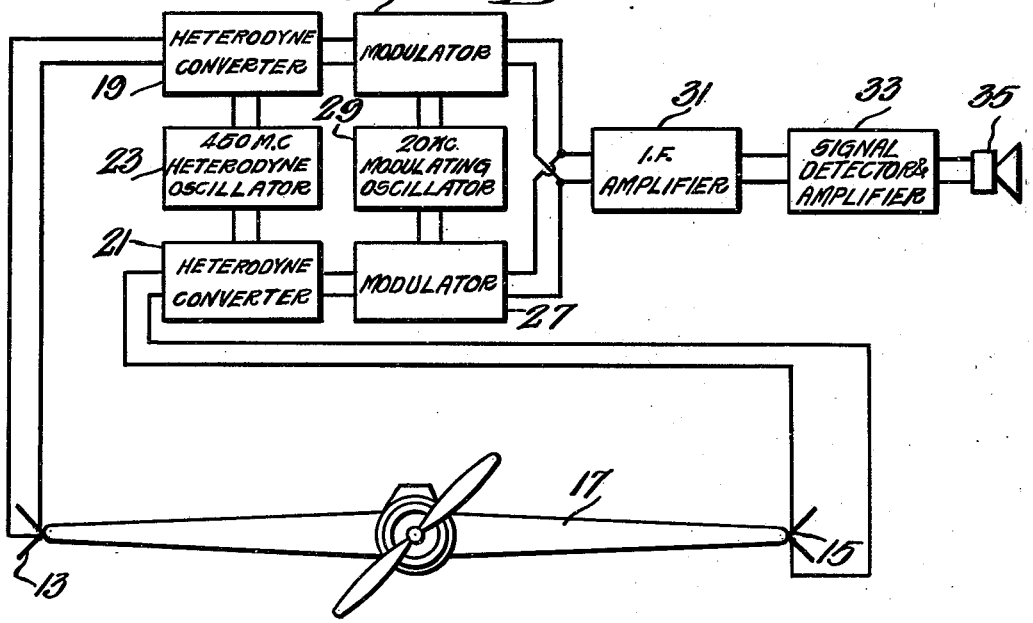
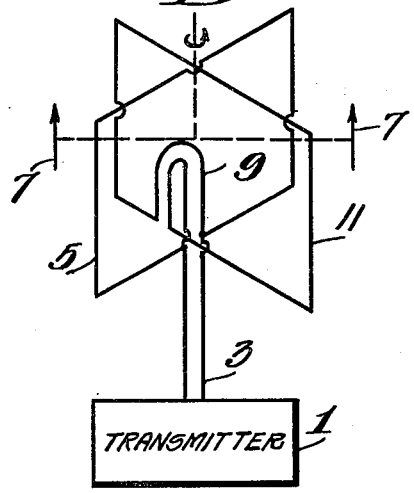
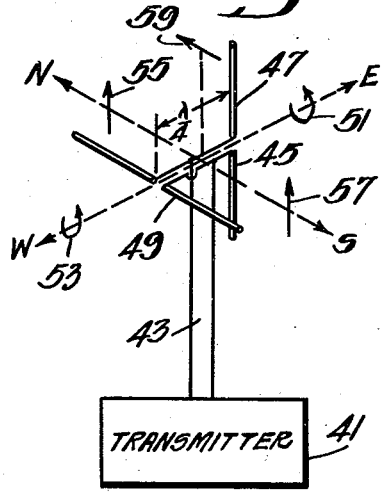
Inventor
Wendell L. Carlson
Attorney Patented July 9, 1946

2,403,500

UNITED STATES PATENT OFFICE 2,403,500

SYSTEM FOR AND METHOD OF AIRCRAFT RADIO COMMUNICATION

Wendell L. Carlson, Haddonfield, N. J., assignor to Radio Corporation of America, a corporation of Delaware Application October 22, 1941, Serial No. 416,022

13 Claims. (Cl. 250—6)

This invention relates to improvements in systems for and methods of aircraft communication, and particularly to a system for communicating between a fixed radio station and a moving aircraft station so that the radio waves will be effective at all attitudes and all positions of the aircraft.

In aircraft radio systems, difficulties in maintaining communication are often experienced due to changes in the attitude or position of the aircraft. The changes in attitude may be so pronounced that the wings of the aircraft may come between the ground station and the antenna thereby completely shielding the antenna. The signal waves may be reflected from the plane parts, such as the wings, and may induce signals into the antenna which oppose the normal signal waves received on the antenna. The changes in position of the aircraft may be sufficient to direct the antenna response pattern away from the ground station instead of toward it, so that the signals, received under conditions of normal antenna directivity, disappear. Another null signal position is often found in passing directly over an antenna which has no vertical response. One example of the effect of the attitude of the aircraft is found in an aircraft in which the antenna is installed below the belly of the craft. When the craft is banked sharply, so that the antenna is shielded by the craft, no signals will be received from the station from which the antenna is shielded. If the antenna should be mounted above the belly of the craft, the instant difficulty would be overcome only to incur a new difficulty; namely, the shielding would be effective in the opposite direction. In a similar manner, if the antenna on the aircraft is arranged for receiving vertically polarized waves in normal flight, and if the craft is banked steeply, the antenna will become responsive only to horizontally polarized waves so that signals will be lost during the bank.

It is one of the objects of the instant invention to provide improved means for communicating between a fixed radio station and an aircraft radio station so that communication will be effective at substantially all attitudes and substantially all positions of the aircraft. Another object is to provide an improved method for aircraft communication in which the transmission includes circularly polarized components and the reception is directed alternately along two different paths so that at least one of said paths is always responsive. Another object is to provide an improved method for aircraft radio communication in which circularly polarized waves are radiated toward the zenith and vertically polarized waves are radiated horizontally and in which the waves are received alternately over differently directed paths so that signals will be received substantially independently of the attitude and position of the aircraft to which the signals are directed. An additional object is to provide an aircraft radio system in which a pair of antennas are connected through separate amplifiers to a combining circuit whose output includes a single communication signal. A further object is to provide a receiving antenna which will normally respond to circularly polarized waves arriving from any direction.

The invention will be described by referring to the accompanying drawing, in which Fig. 1 is a block diagram of one embodiment of the aircraft radio receiver of the invention; and Figs. 2 and 3 are circuit diagrams of two embodiments of the radio transmitter of the invention. It should be understood that the ground station of the system may include either transmitter and the aircraft station may include the receiver of Fig. 1 or the equivalent thereof.

Referring to Fig. 2, a radio transmitter 1 is connected through a transmission line 3 to a loop antenna 5 which radiates along the horizontal a vertically polarized wave represented by arrows 7. The transmitter 1 is also connected through the transmission line 3 and a quarter-wave transmission line 9 to a second loop antenna 11 which is spaced at 90° with respect to the first loop antenna 5. The second loop antenna also radiates along the horizontal vertically polarized waves 7. The horizontal portions of the two loops radiate waves toward the zenith. The waves radiated toward the zenith are circularly polarized because the loop currents are in quadrature phase and the loops are normal to each other. Thus the antenna system provides means for radiating circularly polarized waves traveling toward the zenith and vertically polarized waves traveling toward the horizon.

The aircraft radio receiver is shown in Fig. 1, in which a pair of V-shaped dipoles 13, 15 are mounted respectively on the tips of the aircraft wings 17. The antennas are arranged in the vertical plane and are differently directed because of the shielding effect of the wings 17. The antennas are separately connected to heterodyne converters 19, 21 which may include amplifiers. A common oscillator 23 supplies the local oscillations for the signal conversion. The outputs of the converters 19, 21 are respectively applied to modulators 25, 27 which are alternately keyed by a modulating oscillator 29. The outputs of the modulators are combined in a common intermediate frequency amplifier 31. The output of the I.-F. amplifier is applied through a signal detector and amplifier 33 to a signal indicator 35.

The mode of operation of the receiver is as follows: The antennas 15, 17 respond to the transmitted waves, as hereinafter described. The currents induced in the antennas are amplified separately in the converters 19 and 21 and are converted into intermediate frequency currents by beating with the local oscillations. The I.-F. currents are alternately applied to the I.-F. amplifier by means of the modulators and are alternately blocked by the modulating oscillator 29. The modulating oscillator biases at the same instant one modulator tube positively and the other modulator tube negatively. The modulating oscillator frequency is chosen so that it will be inaudible (for example, 20 kc.), and may be eliminated by filtering the detector output currents. After modulation and amplification, the currents are combined by the detector and, after amplification, are applied to the signal indicator. The alternately operated paths produce, after combination, a single communication signal so that the operator cannot determine from the signals themselves whether the waves received are from one dipole or the other, or both.

The dipole radiators of each antenna are preferably a quarter-wave long and are arranged to form an angle of about 90° with respect to each other. The dipoles are mounted so that a longitudinal line through the wings will bisect the angle formed by the radiators.

With the dipoles in this location, and with the plane in normal flight, one or the other or both antennas will be in the direct path of signals arriving from the horizon. Signals will be induced in the antenna from vertical or circularly polarized waves. When the plane is directly above the transmitter, a circularly polarized wave will cause signals to be induced in the antennas.

While the foregoing method operates substantially independently of the attitude and position of the aircraft and is entirely satisfactory for communication employed in commercial air transportation and in most war operations, a completely responsive system may be required for radio control in which a beam is directed toward the aircraft to be controlled. In such operation, a beam of circularly polarized waves may be directed toward the aircraft by the transmitter of Fig. 3. In Fig. 3, a transmitter 41 is connected by a transmission line 43 to a quarter-wave line 45 which terminates in a pair of dipoles 47, 49. One of the dipoles 47 is disposed vertically; the other dipole 49 is arranged horizontally. The waves radiated toward the east and west horizons are circularly polarized as indicated by the reference marks 51, 53. The waves radiated toward the north and south horizons are vertically polarized as indicated by the arrows 55, 57. The waves radiated toward the zenith are horizontally polarized as indicated by the arrow 59.

In operating the transmitter of Fig. 3, the circularly polarized waves, which for convenience have been described with respect to radiation toward the east-west horizon, are directed toward the aircraft to be controlled. It should be understood that the beam must be directed in both azimuth and elevation to obtain complete control without regard to the attitude of the aircraft. If the waves are thus directed to the aircraft, the dipole antennas 13, 15, or one of them, will respond regardless of the attitude of the craft. The output of the receiver, which is operated as previously described, may be used for controlling the maneuvers of the craft.

Thus the invention has been described as an improved radio communication system for aircraft. In one arrangement, the ground transmitter is arranged to radiate along the horizon vertically polarized waves, which are alternately received on V-shaped dipoles located at the wing tips of the craft. Two receiving antennas might, if preferred, be located above and below the body of the plane. The alternately received signals are combined to form a single communication signal. While the receiver has been described as a superheterodyne, with the modulator 29 operating after the conversion, it should be understood that the conversion step may be eliminated and the circuits operated at radio frequency. The modulator 29, which alternately operates the two channels, may be located ahead of the heterodyne converters 19, 21 or may be combined with the local oscillator. It is possible to eliminate the modulator by amplifying separately and combining in the audio or output signal channel. While the system has been described in connection with aircraft communications, it should be understood that the system is not limited to any particular type of communications.

I claim as my invention:

1. The method of communicating between a fixed station and a moving aircraft station which includes radiating radio waves including circularly polarized components from said fixed station, continuously receiving said waves at said aircraft station, and indicating the reception of said waves from all directions of arrival and at substantially all attitudes of said aircraft as a single communication signal.

2. The method of communicating between a fixed station and a moving aircraft station which includes radiating circularly polarized waves toward the zenith, radiating vertically polarized waves along the horizontal, continuously receiving said waves on said aircraft, and indicating the reception of said waves from all directions of arrival as a single communication signal independently of the normal attitude or position of said aircraft.

3. The method of communicating between a fixed station and a moving aircraft station which includes radiating radio energy in waves including circularly polarized components, separately and continuously receiving said waves at said aircraft along paths differently directed from said aircraft, and indicating the received waves from all directions of arrival substantially independently of the direction of said paths as a single communication.

4. The method of communicating between a fixed station and a moving aircraft station which includes radiating radio energy toward the zenith in circularly polarized waves, radiating radio energy along the horizontal in vertically polarized waves, receiving said circularly polarized waves on said aircraft when said aircraft is at zenithal positions and said vertically polarized waves on said aircraft when said aircraft is at horizontal positions along differently directed paths alternatively effective, and indicating the alternately received waves substantially independently of the direction of said paths as a single communication.

5. The method of communicating between a fixed station and a moving vehicle station including a pair of antennas having different directional response which includes the steps of radiating radio waves including circularly polarized components, receiving said waves separately on said antennas, separately amplifying said separately received waves, and combining the thus amplified signals to form a single communication signal.

6. The method of communicating between a fixed station and a moving aircraft station which includes the steps of radiating circularly polarized waves toward the zenith, radiating vertically polarized waves along the horizontal, receiving said waves on said moving aircraft station along differently directed paths, separately amplifying said separately received waves, and combining the thus amplified signals to form a single communication signal.

7. The method of communication between a fixed station and a moving aircraft station by means of radio energy which includes the steps of radiating circularly polarized waves toward the zenith, radiating vertically polarized waves along the horizontal, receiving said circularly polarized waves on said aircraft at zenithal positions, receiving said vertically polarized waves on said aircraft at horizontal positions, and indicating the reception of said waves substantially independently of the attitude or position of said aircraft.

8. The method of communicating between a fixed station and a moving aircraft station including a fixed antenna array which includes radiating radio waves including circularly polarized components from said fixed station, receiving said waves on said fixed antenna array, and indicating the reception of said waves from substantially all directions of arrival and at substantially all attitudes of said craft as a single communication signal.

9. A communication system for aircraft including means for radiating from a ground station radio waves including circularly polarized components, a pair of differently directive antennas located on said aircraft and responsive to said waves, means connected to said antennas for amplifying alternately said waves, means for combining said alternately amplified waves, and means for indicating said combined waves as a single communication signal.

10. A communication system for aircraft including means for radiating circularly polarized waves toward the zenith, means for radiating vertically polarized waves toward the horizontal, a pair of antennas located on said aircraft and differently directed and responsive to said waves, means connected to said antennas for amplifying alternately said waves, means for combining said alternately amplified waves, and means for indicating said combined waves as a single communication signal.

11. An aircraft receiving system including a pair of antennas differently directed and responsive to radio waves including circularly polarized components and vertically polarized components, means connected to said antennas for amplifying separately the received waves, means for combining said separately amplified waves, and means responsive to said combined waves for indicating said reception as a single communication signal.

12. A communication system including in combination means for transmitting circularly polarized waves, an obstruction movable with respect to the earth and located in the path of said waves, and means including two fixedly related antennas disposed in different fixed positions with respect to said obstruction for continuously and cooperatively receiving said waves arriving in any plane of orientation.

13. A communication system including in combination means for transmitting circularly polarized waves, an obstruction movable with respect to the earth and located in the path of said waves, and means including a pair of V shaped antennas disposed in different fixed position with respect to said obstruction for continuously receiving said waves from all directions of arrival at said antenna irrespective of the attitude of said antenna.

WENDELL L. CARLSON.